US012798350B2

(12) United States Patent
Hahn et al.

(10) Patent No.: US 12,798,350 B2
(45) Date of Patent: Nov. 17, 2026

(54) MOTOR VEHICLE WITH SUPPORT STRUCTURE AND HIGH-VOLTAGE BATTERY

(71) Applicant: MAGNA STEYR Fahrzeugtechnik Gmbh & Co KG, Graz (AT)

(72) Inventors: Christian Hahn, Affing (DE); Manfred Wonisch, Goessendorf (AT)

(73) Assignee: MAGNA STEYR Fahrzeugtechnik Gmbh & Co KG, Graz (AT)

( * ) Notice: Subject to any disclaimer, the term of this patent is extended or adjusted under 35 U.S.C. 154(b) by 325 days.

(21) Appl. No.: 18/532,014

(22) Filed: Dec. 22, 2023

(65) Prior Publication Data

US 2024/0217328 A1 Jul. 4, 2024

(30) Foreign Application Priority Data

Jan. 3, 2023 (DE) ......................... 102023200042.3

(51) Int. Cl.

*B60K 1/04* (2019.01)
*B62D 21/03* (2006.01)
*H01M 50/249* (2021.01)
*B60L 50/64* (2019.01)

(52) U.S. Cl.

CPC ................ *B60K 1/04* (2013.01); *B62D 21/03* (2013.01); *H01M 50/249* (2021.01); *B60K 2001/0438* (2013.01); *B60L 50/64* (2019.02); *H01M 2220/20* (2013.01)

(58) Field of Classification Search

CPC ............. B60K 1/04; B60K 2001/0438; H01M 50/249; H01M 50/244; H01M 2220/20; B60L 50/64; B62D 21/03; B62D 21/07; B62D 21/157; B62D 25/025

See application file for complete search history.

(56) References Cited

U.S. PATENT DOCUMENTS

| | | | |
|---|---|---|---|
| 10,513,295 | B2 | 12/2019 | Takahashi |
| 11,312,220 | B2 | 4/2022 | Yamada et al. |
| 2004/0035617 | A1 | 2/2004 | Chaney |

(Continued)

FOREIGN PATENT DOCUMENTS

| | | | |
|---|---|---|---|
| DE | 102015205413 | A1 | 9/2016 |
| DE | 102015205413 | B4 | 8/2018 |
| DE | 102019121682 | A1 | 2/2021 |

OTHER PUBLICATIONS

European Patent Office search report for EP 23209310.4, mailed Apr. 2024.

(Continued)

*Primary Examiner* — Lori Wu

(74) *Attorney, Agent, or Firm* — Jordan IP Law, LLC; Todd A. Vaughn

(57) ABSTRACT

A motor vehicle that includes a carrier structure formed from longitudinal beams, cross-beams, and a battery frame ring that integrally forms at least a radially inner portion of the longitudinal beams and/or the cross-beams. The motor vehicle further includes a battery housing formed at least partially by the battery frame ring, and a high-voltage battery arranged in a battery housing, the high-voltage battery being arranged in a space delimited by the longitudinal beams and the cross-beams.

20 Claims, 4 Drawing Sheets

(56) References Cited

U.S. PATENT DOCUMENTS

| | | | | |
|---|---|---|---|---|
| 2008/0184544 | A1* | 8/2008 | Hasegawa | B21D 39/021 29/243.57 |
| 2016/0318556 | A1* | 11/2016 | Ikeda | F16B 5/04 |
| 2018/0148106 | A1* | 5/2018 | Ayukawa | B62D 25/20 |
| 2020/0156486 | A1 | 5/2020 | Howard et al. | |
| 2020/0398652 | A1* | 12/2020 | Stephens | B62D 25/025 |

OTHER PUBLICATIONS

Search Report from the German Patent and Trademark Office for application 2022P00166DE, dated Oct. 6, 2023.

* cited by examiner

MOTOR VEHICLE WITH SUPPORT STRUCTURE AND HIGH-VOLTAGE BATTERY

CROSS-REFERENCE TO RELATED APPLICATIONS

The present application claims priority under 35 U.S.C. § 119 to German Patent Publication No. DE102023200042.3 (filed on Jan. 3, 2023), which is hereby incorporated by reference in its complete entirety.

TECHNICAL FIELD

One or more embodiments of the present disclosure relates to a motor vehicle comprising a carrier structure and a high-voltage battery.

BACKGROUND

It is known that motor vehicles comprise a carrier structure which in each case comprises at least two longitudinal beams and at least two cross-beams. The two longitudinal beams are also referred to as sill panels. Additional longitudinal beams may be arranged in front of and behind the cross-beams. The longitudinal beams and cross-beams may be in the form of hollow profiles. A body may be placed on such a carrier structure. The carrier structure and the structure of a motor vehicle may also be combined to form a unit, wherein this is then referred to as a self-supporting body and a shell construction type. The carrier structure may in this instance be constructed from shells, in particular from sheet metal shells.

Motor vehicles having an electric drive use high-voltage batteries in order to provide the electrical energy required. For a higher storage capacity, the high-voltage batteries require a large construction space. They may, for example, be arranged in the region of the floor of a motor vehicle, between longitudinal beams and cross-beams of the motor vehicle.

SUMMARY

One or more embodiments of the present disclosure provides a motor vehicle that is produced in a simple and cost-effective manner. The motor vehicle comprises a carrier structure and a high-voltage battery arranged in a space-saving manner in the motor vehicle.

In accordance with the one or more embodiments, a motor vehicle comprises one or more of the following: a carrier structure comprising at least two longitudinal beams, at least two cross-beams, and a battery frame ring that integrally forms at least a radially inner portion of the at least two longitudinal beams and/or the at least two cross-beams; a battery housing formed at least partially by the battery frame ring; and a high-voltage battery arranged in a battery housing, the high-voltage battery being arranged in a space which is delimited by the longitudinal beams and the cross-beams.

In accordance with the one or more embodiments, the battery frame ring integrally forms the radially inner portions of the at least two longitudinal beams and/or the at least two cross-beams.

In accordance with the one or more embodiments, a high-voltage battery is arranged in the space between lateral longitudinal beams (e.g., sill panels), and cross-beams which delimit at the front and rear. At least radially inner portions of the longitudinal beams and/or the cross-beams are at the same time used as a portion of the battery housing so that an annular component, i.e., the "battery frame ring," assumes a dual function. Thus, space and costs which are otherwise required for the two components are saved.

In accordance with the one or more embodiments, the dual-use component forms an integral ring, i.e., the "battery frame ring." The "battery frame ring" consequently combines components of the frame structure and the battery housing. Complex processes for joining carrier structure components to each other in order to form the side face, which is completely closed, of the battery housing can consequently be dispensed with. As a result of such an integral battery frame ring, the production and, in particular, a tight connection to a battery cover and/or battery base and/or other components of the carrier structure can be carried out in a significantly simpler and more cost-effective manner. In the production, a large number of working steps and great weight can be saved, and the sealing of the subsequent battery space can be enhanced.

Should a portion of the battery housing be formed from a conventional ladder frame structure, the position which also forms the battery housing would have to be connected to other components via complex arc/melt welding methods. In other complex working steps, the connection seams would subsequently have to be ground smooth in order to produce the most optimum possible sealing faces for the upper and lower battery housing cover. The upper battery housing cover would have to be screwed, for example, to an upper flange face of a painted frame via a seal or sealing mass. Such a housing would have to checked for sealing before assembly in a vehicle and repaired in the event of a leakage. Only afterwards would the frame be able to be mounted below the body in the vehicle. In the case of leakages which subsequently occur, a repair is very complex since the body would have to be raised or disassembled in order to gain access to the screws and the upper battery cover.

In accordance with the one or more embodiments, it is also possible to use portions of the frame structure of an electric vehicle as a portion of the high-voltage battery housing. The required fixed and tight connections of the battery housing and the carrier structure may in this instance be produced in a simple and cost-effective manner. The number of components is in this instance reduced and consequently mass and costs are saved. Furthermore, structural space is also saved by this solution because double walls are dispensed with.

As used herein, the terms "top" and "bottom" refer to the usual position of a motor vehicle and the vehicle z direction so that "top" is further away from the road surface in the z direction and "bottom" is closer to the road surface than the "bottom" in the z direction.

In accordance with the one or more embodiments, the battery frame ring is a deep-drawn component.

In accordance with an alternative embodiment, the battery frame ring is a cast component.

In accordance with the one or more embodiments, the battery frame ring is joined at the upper side thereof to a battery housing cover, in particular, joined in a gas-tight manner. For this joining operation, different simple and cost-effective methods are available. The battery frame ring may be joined at the upper side thereof to the battery housing cover preferably via laser-welding, via laser-soldering, via roller hemming or via screwing with a seal.

In accordance with the one or more embodiments, the annular component, i.e., the battery frame ring, is closed at the upper side thereof with the battery housing cover in a gas-tight manner.

In accordance with the one or more embodiments, the battery housing cover is preferably a simple, conventional and preferably substantially planar metal sheet. A separate battery housing cover which is otherwise provided may preferably be dispensed with since the component which is referred to in this instance as the battery housing cover is preferably a floor component which otherwise closes the vehicle interior in a downward direction and which at the same time forms the battery housing cover.

In accordance with the one or more embodiments, the battery housing is delimited at the underside thereof by a base, wherein the base preferably forms a vehicle underbody closure. The base of the battery housing is preferably a separate component and is consequently produced separately from the battery frame ring.

In accordance with the one or more embodiments, the longitudinal beams and/or the cross-beams comprise in addition to the battery frame ring at least one or more sheet metal shells which are joined to the battery frame ring in order to form the longitudinal beams and/or the cross-beams. The carrier structure is preferably in the form of a sheet metal shell construction type. The longitudinal beams and/or the cross-beams may, in addition to the "battery frame ring", also be produced from one or more profiles or hollow profiles, for example, extruded profiles, which have one or more chambers, or which are connected via corresponding webs. In such a construction type, the profile may also be configured to be correspondingly lighter or correspondingly less rigid as a result of the presence or the connection to the battery frame ring since in combination with the battery frame ring the required rigidity of the body is produced.

DRAWINGS

One or more embodiments of the present disclosure will be illustrated by way of example in the drawings and explained in the description hereinbelow.

DESCRIPTION

Figure 1:
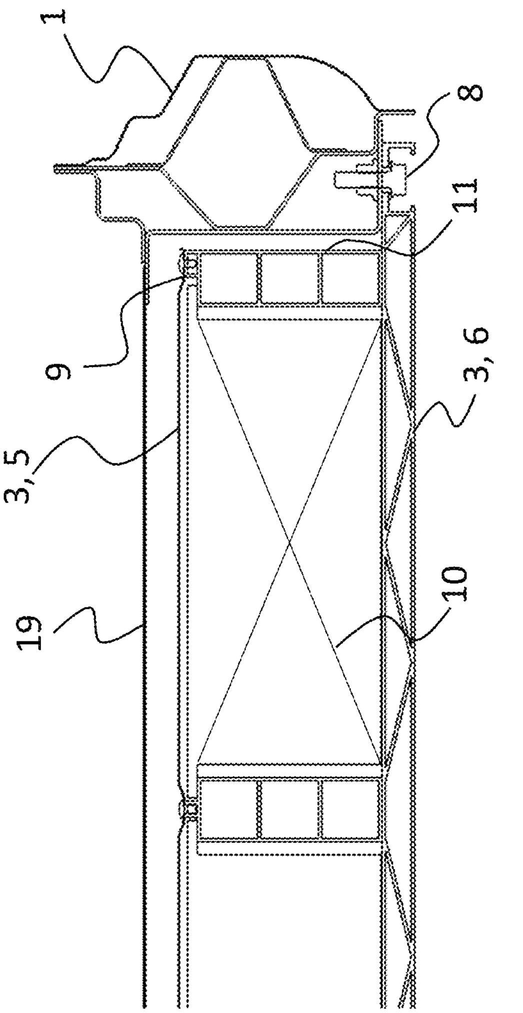
FIG. 1 illustrates a partially sectioned view of a carrier structure and a battery frame of a motor vehicle.

In FIG. 1, a general carrier structure and a battery frame of a motor vehicle is illustrated as a cut-out. The motor vehicle has a carrier structure having a sill panel, i.e., a lateral longitudinal carrier 1 which is in the form of a hollow profile. Via a fastening member 8 such as a screw, the base 6 of a battery housing 3 is secured to the longitudinal carrier 1. A battery housing cover 5 which is laterally connected to the base via battery structures 11, such as partition walls which act as side walls of the battery housing, is joined tightly to the base 6. Alternatively, the battery housing cover 5 may also extend downwards towards the base 6 and may form a side wall of the battery housing 3. The side wall of the battery housing 3 is in both cases spaced apart from the longitudinal carrier 1. A seal 9 is arranged between the base 6 and the battery housing cover 5. Battery cells 10 are arranged inside the battery housing 3. In a state parallel with the battery housing cover 5 and separate from it, a base component 19 which terminates the interior of the motor vehicle in a downward direction is arranged above the battery housing cover 5.

Figure 2:
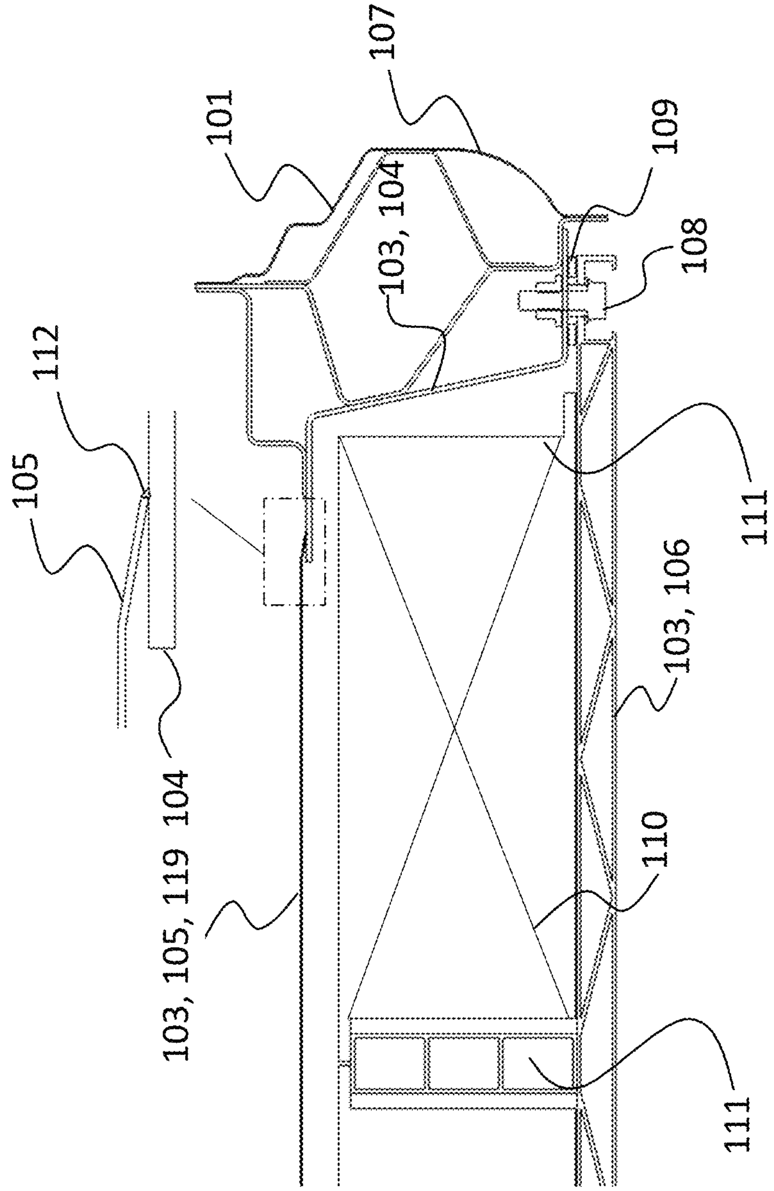
FIG. 2 illustrates a partially sectioned view of a carrier structure and a battery frame of a motor vehicle, in accordance with one or more embodiments.
Figure 3:
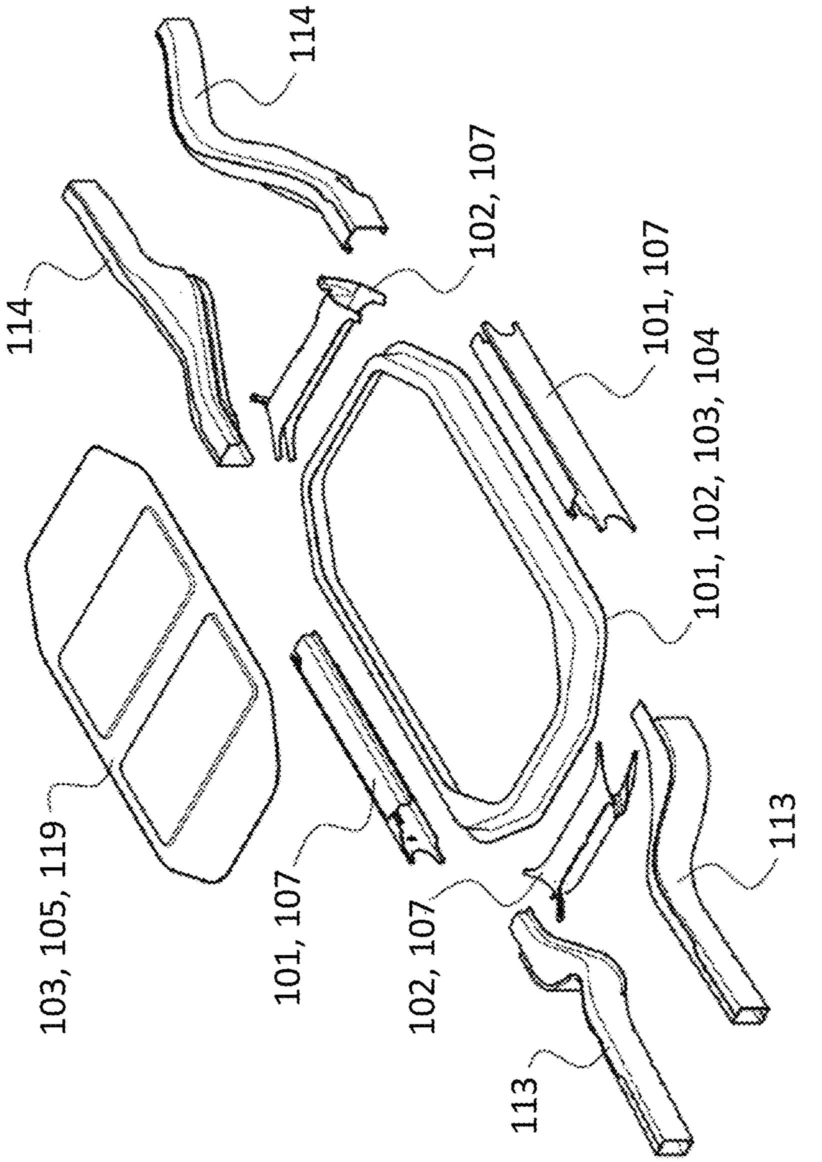
FIG. 3 illustrates an exploded, perspective view of a carrier structure and a battery frame of a motor vehicle, in accordance with one or more embodiments.

FIGS. 2 and 3 respectively illustrate a motor vehicle in accordance with one or more embodiments, and includes a carrier structure comprising two lateral longitudinal beams 101, i.e., sill panels, between two transverse or cross-beams 102, and two front longitudinal beams 113 and two rear longitudinal beams 114 which are arranged in front of a front transverse beam 102 or behind a rear transverse beam 102. The motor vehicle also comprises a high-voltage battery arranged in a battery housing 103. The high-voltage battery and the battery housing 103 are arranged in the space which is delimited by the longitudinal beams 101 and the transverse beams 102.

As illustrated in FIGS. 2 and 3, a lateral portion of the longitudinal beam 101, i.e., a side wall of the longitudinal beam 101, is formed via a battery frame ring 104, in particular a deep-drawn component. This battery frame ring 104 forms, in addition to its function as a portion of the carrier structure, a portion of the battery housing 103 for the high-voltage battery, i.e., a side wall of the battery housing 103.

As illustrated in FIG. 3, radially inner portions of the two longitudinal beams 101 and the two transverse beams 102 may be formed integrally via the battery frame ring 104 so that the battery frame ring 104 forms a circumferential ring which forms all the side walls of the battery housing 103. The term "radially inner" refers in this instance to the shape of this ring, the battery frame ring 104 and consequently the ring which is formed by the longitudinal beams 101 and the transverse 102 and consequently means closer to the centre of this ring.

Figure 4:
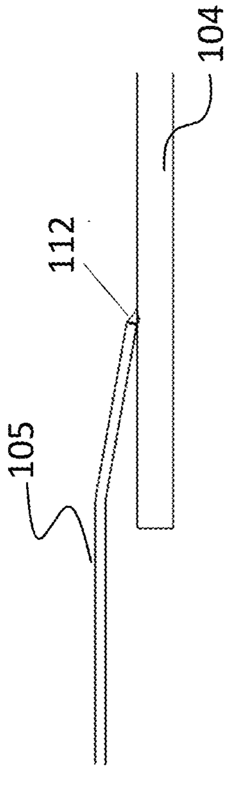
FIG. 4 illustrates a detailed illustration of a connection region of the battery cover to the battery frame ring of the carrier structure and the battery frame of the motor vehicle of FIG. 2.

The battery frame ring 104 is tightly joined at the upper side thereof to a battery housing cover 105. As can be seen in the detailed enlargement of FIGS. 2 and 4, the battery housing cover 105 can be joined via a simple laser-welding seam 112 or a laser-soldering seam to the deep-drawn component, i.e., the battery frame ring 104. The battery frame ring 104 is closed in a gas-tight manner at the upper side thereof with the battery housing cover 105. The battery housing cover 105 is formed as a simple, conventional metal sheet. The battery housing cover 105 is constructed to be substantially flat and does not form the side walls of the battery housing 103. The battery housing cover 105 forms at the same time a base component 119 which terminates the interior of the motor vehicle in a downward direction.

Figure 6:
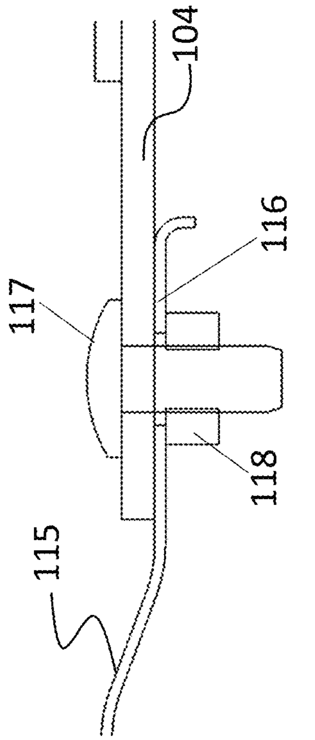
FIG. 6 illustrates a detailed illustration of an alternative embodiment of a connection region of the battery cover to the battery frame ring of the carrier structure and the battery frame of the motor vehicle of FIG. 2.
Figure 5:
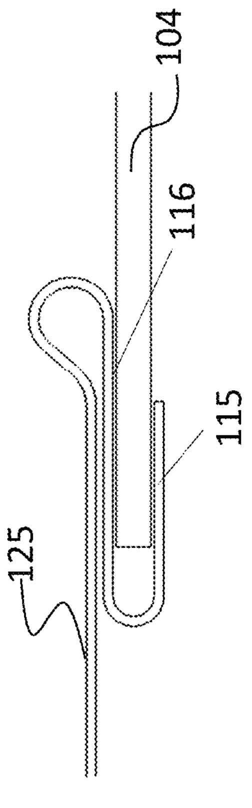
FIG. 5 illustrates a detailed illustration of an alternative embodiment of a connection region of the battery cover to the battery frame ring of the carrier structure and the battery frame of the motor vehicle of FIG. 2.

Other alternatives to joining the battery frame ring 104 and battery housing cover 105 which may also form the base component 119 are illustrated in FIGS. 5 and 6.

FIG. 5 illustrates a connection of the battery housing cover 125 via roller hemming. In this instance, a roller hemming flange 115 is preferably secured to an edge of the battery frame ring 104, in particular the edge of the battery frame ring 104 is clamped in the roller hemming flange 115.

Between the roller hemming flange 115 and the battery frame ring 104 there is preferably a sealing member and/or adhesive 116.

FIG. 6 illustrates a connection of the battery housing cover 105 via a mechanical fastener such as a screw 117 that is inserted with a screw head through screw holes in the battery frame ring 104 and in the battery housing cover 105 and closed via nuts 118. In turn, a sealing agent and/or adhesive 116 can be applied between the battery housing cover 105 and the battery frame ring 104.

As illustrated in FIG. 2, a seal 109 serves to form a seal between a base 106 of the battery housing 103 and the battery frame ring 104. The battery frame ring 104 can be secured to the base 106 using a fastening member 108, such as a screw. The base 106 forms a vehicle underbody closure.

The longitudinal beams 101 comprise in addition to the battery frame ring 104 further sheet metal shells 107 which are joined to the battery frame ring 104 in order to form the longitudinal carriers, in particular additional side walls or reinforcements of the longitudinal beam 101.

In accordance with the one or more embodiments, weld connections on the frame component which at the same time forms a portion of the battery housing 103 can be dispensed with since it is produced from an integral battery frame ring 104, in particular, a deep-drawn metal sheet. This component is referred to as a "battery frame ring." Since in this instance there are no irregular connection weld seams, no complex grinding operations are required.

For the upper battery housing cover 105, 125 which forms the cover with respect to the underbody of the body, i.e., the base component 119, four advantageous connection variants between the battery frame ring 104 and battery housing cover 105, 125 are set out. Depending on the material pairing between the components, the battery housing cover 105, 125 can be connected via laser-welding, laser-soldering, roller hemming or screws with sealing to the battery frame ring 104.

The battery frame ring 104 may preferably be deep-drawn either from a single-piece sheet metal plate or from a tailor welded blank. Furthermore, the battery frame ring 104 may also in lightweight vehicles be in the form of an integral aluminium cast component. It forms, on the one hand, a portion of the frame structure, i.e., the carrier structure, of a motor vehicle and further forms a portion of the battery housing 103. The material selection of the battery frame ring 104 is selected with regard to the requirements of the vehicle and can differ in terms of the material and the material wall thicknesses from the upper battery cover 105, 125. For this reason, the connection of the upper battery housing cover 105, 125 to the battery frame ring 104 is carried out using different connection techniques. Depending on the material pairing between the components, the cover 105, 125 can be connected via laser-welding, laser-soldering, roller hemming or screwing with a seal to the battery frame ring 104. The additional frame structure of the ladder frame or the body is constructed around the battery frame ring 104 in several joining steps.

The terms "coupled," "attached," or "connected" may be used herein to refer to any type of relationship, direct or indirect, between the components in question, and may apply to electrical, mechanical, fluid, thermal, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims

What is claimed is:

1. A motor vehicle, comprising:

a carrier structure comprising at least two longitudinal beams, at least two cross-beams, and a battery frame ring that integrally forms at least a radially inner portion of the at least two longitudinal beams and/or the at least two cross-beams;

a battery housing formed at least partially by the battery frame ring;

a battery housing cover that covers an upper side of the battery frame ring in a gas-tight manner and serves as a vehicle floor that terminates an interior of the motor vehicle in a downward direction; and a high-voltage battery arranged in the battery housing, the high-voltage battery being arranged in a space delimited by the at least two longitudinal beams and the at least two cross-beams.

2. The motor vehicle of claim 1, wherein the battery frame ring is formed as a deep-drawn component.

3. The motor vehicle of claim 1, wherein the battery frame ring is joined at an upper side thereof to the battery housing cover via laser-welding.

4. The motor vehicle of claim 1, wherein the battery frame ring is joined at an upper side thereof to the battery housing cover via laser-soldering.

5. The motor vehicle of claim 1, wherein the battery frame ring is joined at an upper side thereof to the battery housing cover via a roller hemming flange with a seal.

6. The motor vehicle of claim 1, wherein the battery frame ring is joined at an upper side thereof to the battery housing cover via screwing with a seal.

7. The motor vehicle of claim 1, wherein the battery frame ring is sealed at an upper side thereof with the battery housing cover in a gas-tight manner.

8. The motor vehicle of claim 1, wherein the battery housing cover is formed as a substantially planar metal sheet.

9. The motor vehicle of claim 1, further comprising a base forming vehicle underbody closure that delimits the battery housing at an underside thereof.

10. The motor vehicle of claim 1, wherein the at least two longitudinal beams and/or the at least two cross-beams comprise at least one or more sheet metal shells joined to the battery frame ring.

11. The motor vehicle of claim 1, wherein the at least two longitudinal beams and/or the at least two cross-beams comprise one or more hollow profiles.

12. The motor vehicle of claim 1, wherein the at least two longitudinal beams and/or the at least two cross-beams comprise extruded components.

13. The motor vehicle of claim 1, wherein the at least two longitudinal beams and/or the at least two cross-beams define one or more chambers.

14. The motor vehicle of claim 1, wherein the at least two longitudinal beams and/or the at least two cross-beams are connected via one or more webs.

15. A motor vehicle, comprising:

a carrier structure comprising longitudinal beams, cross-beams, and a battery frame ring that integrally forms at least a radially inner portion of the longitudinal beams and/or the cross-beams;

a battery housing formed at least partially by the battery frame ring;

a battery housing cover that covers an upper side of the battery frame ring in a gas-tight manner and serves as a vehicle floor that terminates an interior of the motor vehicle in a downward direction; and a high-voltage battery arranged in the battery housing, the high-voltage battery being arranged in a space delimited by the longitudinal beams and the cross-beams.

16. The motor vehicle of claim 15, further comprising a base forming vehicle underbody closure that delimits the battery housing at an underside thereof.

17. The motor vehicle of claim 15, wherein the longitudinal beams and/or the cross-beams comprise at least one or more sheet metal shells joined to the battery frame ring.

18. The motor vehicle of claim 15, wherein the at least two longitudinal beams and/or the at least two cross-beams define one or more chambers.

19. A motor vehicle, comprising:

a carrier structure comprising longitudinal beams, cross-beams, and a battery frame ring that integrally forms at least a radially inner portion of the longitudinal beams and/or the cross-beams;

a battery housing formed at least partially by the battery frame ring;

a battery housing cover that covers an upper side of the battery frame ring in a gas-tight manner;

a high-voltage battery arranged in the battery housing, the high-voltage battery being arranged in a space delimited by the longitudinal beams and the cross-beams; and a vehicle floor formed by the battery housing cover.

20. The motor vehicle of claim 19, wherein the at least two longitudinal beams and/or the at least two cross-beams define one or more chambers.

* * * * *